(12) United States Patent
Takeda et al.

(10) Patent No.: US 12,154,711 B2
(45) Date of Patent: Nov. 26, 2024

(54) ADHESIVELY-LAMINATED CORE FOR STATOR AND ELECTRIC MOTOR

(71) Applicant: NIPPON STEEL CORPORATION, Tokyo (JP)

(72) Inventors: Kazutoshi Takeda, Tokyo (JP); Ryu Hirayama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 697 days.

(21) Appl. No.: 17/294,519

(22) PCT Filed: Dec. 17, 2019

(86) PCT No.: PCT/JP2019/049266
§ 371 (c)(1),
(2) Date: May 17, 2021

(87) PCT Pub. No.: WO2020/129925
PCT Pub. Date: Jun. 25, 2020

(65) Prior Publication Data
US 2022/0020521 A1 Jan. 20, 2022

(30) Foreign Application Priority Data
Dec. 17, 2018 (JP) .................. 2018-235864

(51) Int. Cl.
*H01F 27/245* (2006.01)
*H01F 41/02* (2006.01)
(Continued)

(52) U.S. Cl.
CPC ....... *H01F 27/245* (2013.01); *H01F 41/0233* (2013.01); *H02K 1/185* (2013.01); *H02K 15/024* (2013.01)

(58) Field of Classification Search
CPC . C09J 133/04; C09J 2203/326; H01F 27/245; H01F 41/0233; H01K 1/04;
(Continued)

(56) References Cited

U.S. PATENT DOCUMENTS 3,386,058 A 5/1968 Michel
4,025,379 A 5/1977 Whetstone
(Continued)

FOREIGN PATENT DOCUMENTS

CN 102792556 A 11/2012
EP 3553799 A1 10/2019
(Continued)

OTHER PUBLICATIONS

Japanese Industrial Standard (JIS) C 2552: 2014, relevance discussed in specification.
(Continued)

*Primary Examiner* — Kevin C T Li
(74) *Attorney, Agent, or Firm* — Renner, Otto, Boisselle & Sklar, LLP

(57) ABSTRACT

Provided is an adhesively-laminated core for a stator including: a plurality of electrical steel sheets which have phosphate-based insulation coatings on surfaces thereof and are overlapped coaxially with each other; and adhesion parts provided between the respective electrical steel sheets, an average thickness of the insulation coatings is 0.3 μm to 1.2 μm, an average thickness of the adhesion parts is 1.0 μm to 3.0 μm, and in a case where the average thickness of the insulation coating is defined as t1 in a unit of μm, and the average thickness of the adhesion parts is defined as t2 in a unit of μm, the following Equation 1 is satisfied.

$$-4.3 \times t1 + 3.6 \leq t2 \leq -4.3 \times t1 + 6.9 \quad \text{(Equation 1)}$$

6 Claims, 5 Drawing Sheets

(51) Int. Cl.
   *H02K 1/18* (2006.01)
   *H02K 15/02* (2006.01)
(58) Field of Classification Search
   CPC .......... H01K 1/18; H01K 1/185; H01K 15/02;
              H01K 15/024; H01K 2213/03; Y02T
                                  10/64; H02K 1/185
   See application file for complete search history.

(56) References Cited

U.S. PATENT DOCUMENTS

| | | | |
|---|---|---|---|
| 4,103,195 | A | 7/1978 | Torossian |
| 4,413,406 | A | 11/1983 | Bennett |
| 5,142,178 | A | 8/1992 | Kloster et al. |
| 5,248,405 | A | 9/1993 | Kaneda et al. |
| 5,338,996 | A | 8/1994 | Yamamoto |
| 5,448,119 | A | 9/1995 | Kono et al. |
| 5,994,464 | A | 11/1999 | Ohsawa et al. |
| 6,495,936 | B2 | 12/2002 | Kikuchi et al. |
| 6,653,758 | B2 | 11/2003 | Tsuneyoshi et al. |
| 7,298,064 | B2 | 11/2007 | Yamamoto |
| 7,562,439 | B2 | 7/2009 | Yamamoto |
| 7,859,163 | B2 | 12/2010 | Bertocchi et al. |
| 7,952,254 | B2 | 5/2011 | Cho et al. |
| 8,015,691 | B2 | 9/2011 | Miyake |
| 8,580,217 | B2 | 11/2013 | Hipszki et al. |
| 8,581,468 | B2 | 11/2013 | Kudose et al. |
| 8,697,811 | B2 | 4/2014 | Kishi et al. |
| 8,943,677 | B2 | 2/2015 | Gerster et al. |
| 9,331,530 | B2 | 5/2016 | Jang et al. |
| 9,512,335 | B2 | 12/2016 | Hoshi et al. |
| 9,770,949 | B2 | 9/2017 | Fudemoto et al. |
| 9,833,972 | B2 | 12/2017 | Ohishi et al. |
| 10,340,754 | B2 | 7/2019 | Ogino et al. |
| 10,348,170 | B2 | 7/2019 | Izumi et al. |
| 10,476,321 | B2 | 11/2019 | Li et al. |
| 10,491,059 | B2 | 11/2019 | Murakami et al. |
| 10,547,225 | B2 | 1/2020 | Hattori et al. |
| 10,574,112 | B2 | 2/2020 | Tomonaga |
| 10,819,201 | B2 | 10/2020 | Thumm et al. |
| 10,840,749 | B2 | 11/2020 | Chaillou et al. |
| 11,056,934 | B2 | 7/2021 | Kubota et al. |
| 11,616,407 | B2 | 3/2023 | Hino et al. |
| 2002/0047459 | A1 | 4/2002 | Adaeda et al. |
| 2002/0163277 | A1 | 11/2002 | Miyake et al. |
| 2004/0056556 | A1 | 3/2004 | Fujita |
| 2004/0124733 | A1 | 7/2004 | Yamamoto et al. |
| 2006/0043820 | A1 | 3/2006 | Nakahara |
| 2007/0024148 | A1 | 2/2007 | Maita et al. |
| 2007/0040467 | A1 | 2/2007 | Gu |
| 2007/0182268 | A1 | 8/2007 | Hashiba et al. |
| 2009/0026873 | A1 | 1/2009 | Matsuo et al. |
| 2009/0195110 | A1 | 8/2009 | Miyaki |
| 2009/0230812 | A1 | 9/2009 | Cho et al. |
| 2010/0090560 | A1 | 4/2010 | Myojin |
| 2010/0197830 | A1 | 8/2010 | Hayakawa et al. |
| 2010/0219714 | A1 | 9/2010 | Abe et al. |
| 2010/0244617 | A1 | 9/2010 | Nobata et al. |
| 2011/0180216 | A1 | 7/2011 | Miyake |
| 2011/0269894 | A1 | 11/2011 | Miyamoto |
| 2012/0088096 | A1 | 4/2012 | Takeda et al. |
| 2012/0128926 | A1 | 5/2012 | Ohishi et al. |
| 2012/0156441 | A1 | 6/2012 | Gerster |
| 2012/0235535 | A1 | 9/2012 | Watanabe |
| 2012/0288659 | A1 | 11/2012 | Hoshi et al. |
| 2013/0244029 | A1 | 9/2013 | Igarashi et al. |
| 2014/0023825 | A1 | 1/2014 | Igarashi et al. |
| 2015/0028717 | A1 | 1/2015 | Luo et al. |
| 2015/0097463 | A1 | 4/2015 | Blocher et al. |
| 2015/0130318 | A1 | 5/2015 | Kitada et al. |
| 2015/0256037 | A1 | 9/2015 | Kudose |
| 2015/0337106 | A1 | 11/2015 | Kajihara |
| 2016/0023447 | A1 | 1/2016 | Shimizu |
| 2016/0352159 | A1 | 12/2016 | Li et al. |
| 2016/0352165 | A1 | 12/2016 | Fubuki |
| 2017/0117758 | A1 | 4/2017 | Nakagawa |
| 2017/0287625 | A1 | 10/2017 | Ito |
| 2017/0342519 | A1 | 11/2017 | Uesaka et al. |
| 2017/0368590 | A1 | 12/2017 | Senda et al. |
| 2018/0030292 | A1 | 2/2018 | Gotou |
| 2018/0056629 | A1* | 3/2018 | Hamamura .......... H02K 15/024 |
| 2018/0134926 | A1 | 5/2018 | Lei et al. |
| 2018/0159389 | A1 | 6/2018 | Nishikawa |
| 2018/0212482 | A1 | 7/2018 | Nigo |
| 2018/0248420 | A1 | 8/2018 | Enokizono et al. |
| 2018/0295678 | A1 | 10/2018 | Okazaki et al. |
| 2018/0309330 | A1 | 10/2018 | Ueda |
| 2018/0342925 | A1 | 11/2018 | Horii et al. |
| 2019/0010361 | A1 | 1/2019 | Hoshi |
| 2019/0040183 | A1 | 2/2019 | Yoshida et al. |
| 2020/0048499 | A1 | 2/2020 | Andou et al. |
| 2020/0099263 | A1 | 3/2020 | Hirosawa et al. |
| 2020/0186014 | A1 | 6/2020 | Kusuyama |
| 2021/0296975 | A1 | 9/2021 | Hino et al. |

FOREIGN PATENT DOCUMENTS

| | | | |
|---|---|---|---|
| EP | 3562006 | A1 | 10/2019 |
| FR | 2803126 | A1 | 6/2001 |
| JP | 56-065326 | A | 6/1981 |
| JP | 57-006427 | A | 1/1982 |
| JP | 60-170681 | A | 9/1985 |
| JP | 60-186834 | A | 12/1985 |
| JP | 60-186834 | U | 12/1985 |
| JP | 62-009951 | A | 1/1987 |
| JP | 63-207639 | A | 8/1988 |
| JP | 01168777 | A * | 7/1989 |
| JP | 03-124247 | A | 5/1991 |
| JP | 03-247683 | A | 11/1991 |
| JP | 04-028743 | A | 3/1992 |
| JP | 04-028743 | U | 3/1992 |
| JP | 07-118620 | A | 5/1995 |
| JP | 07-298567 | A | 11/1995 |
| JP | 08-259899 | A | 10/1996 |
| JP | 10-304610 | A | 11/1998 |
| JP | 11-162724 | A | 6/1999 |
| JP | 2000-050539 | A | 2/2000 |
| JP | 2000-152570 | A | 5/2000 |
| JP | 2001-115125 | A | 4/2001 |
| JP | 2002-078257 | A | 3/2002 |
| JP | 2002-088107 | A | 3/2002 |
| JP | 2002-105283 | A | 4/2002 |
| JP | 2002-125341 | A | 4/2002 |
| JP | 2002-151335 | A | 5/2002 |
| JP | 2002-151339 | A | 5/2002 |
| JP | 2002-164224 | A | 6/2002 |
| JP | 2002-332320 | A | 11/2002 |
| JP | 2003-199303 | A | 7/2003 |
| JP | 2003-206464 | A | 7/2003 |
| JP | 2003-219585 | A | 7/2003 |
| JP | 2003-264962 | A | 9/2003 |
| JP | 2003284274 | | 10/2003 |
| JP | 2004-088970 | A | 3/2004 |
| JP | 2004-111509 | A | 4/2004 |
| JP | 2004-150859 | A | 5/2004 |
| JP | 2005-019642 | A | 1/2005 |
| JP | 2005-268589 | A | 9/2005 |
| JP | 2005-269732 | A | 9/2005 |
| JP | 2006-254530 | A | 9/2006 |
| JP | 2006-288114 | A | 10/2006 |
| JP | 2006-353001 | A | 12/2006 |
| JP | 2007015302 | | 1/2007 |
| JP | 2007-039721 | A | 2/2007 |
| JP | 2008-067459 | A | 3/2008 |
| JP | 4143090 | B | 9/2008 |
| JP | 2009072035 | A | 4/2009 |
| JP | 2009-177895 | A | 8/2009 |
| JP | 2010-004716 | A | 1/2010 |
| JP | 2010081659 | A | 4/2010 |
| JP | 2010-220324 | A | 9/2010 |
| JP | 2010-259158 | A | 11/2010 |
| JP | 2011-023523 | A | 2/2011 |
| JP | 2011-195735 | A | 10/2011 |
| JP | 2012029494 | A | 2/2012 |

(56) References Cited

FOREIGN PATENT DOCUMENTS

| | | |
|---|---|---|
| JP | 2012-061820 A | 3/2012 |
| JP | 2012060773 A | 3/2012 |
| JP | 2012-120299 A | 6/2012 |
| JP | 2012196100 A | 10/2012 |
| JP | 2013-089883 A | 5/2013 |
| JP | 2013-181101 A | 9/2013 |
| JP | 2013-253153 A | 12/2013 |
| JP | 5423465 B2 | 2/2014 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-005906 A | 1/2017 |
| JP | 2017011863 A * | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2017-0087915 A | 7/2017 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017104479 A1 | 6/2017 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/207277 A1 | 11/2018 |
| WO | 2018/216565 A1 | 11/2018 |
| WO | 2020/129921 A1 | 6/2020 |
| WO | 2020/129923 A1 | 6/2020 |
| WO | 2020/129924 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129937 A1 | 6/2020 |
| WO | 2020/129938 A1 | 6/2020 |
| WO | 2020/129940 A1 | 6/2020 |
| WO | 2020/129941 A1 | 6/2020 |
| WO | 2020/129942 A1 | 6/2020 |
| WO | 2020/129946 A1 | 6/2020 |
| WO | 2020/129948 A1 | 6/2020 |
| WO | 2020/129951 A1 | 6/2020 |

OTHER PUBLICATIONS

Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016.
Japanese Industrial Standard (JIS) K 7121-1987.
Japanese Industrial Standard (JIS) K 6850: 1999.
The papers of technical meetings in the Institute of Electrical Engineers of Japan,RM-92-79, 1992.
Matweb, "Plaskolite West Optix® CA—41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).
1 Datasheet of Nylon 6, Cast (Year: N/A, Printed Jun. 28, 2023).

* cited by examiner

ADHESIVELY-LAMINATED CORE FOR STATOR AND ELECTRIC MOTOR

TECHNICAL FIELD

The present invention relates to an adhesively-laminated core for a stator and an electric motor.

Priority is claimed on Japanese Patent Application No. 2018-235864, filed Dec. 17, 2018, the content of which is incorporated herein by reference.

BACKGROUND ART

Conventionally, a laminated core as described in Patent Document 1 below is known. Patent Document 1 below discloses a direct drive motor including a stator disposed coaxially with and inside the rotor. In addition, an insulation coating and an adhesion coating are formed on an electrical steel sheet on a stator side. It is described that when the insulating coating is thinner than 0.80 μm, a sufficient dielectric strength cannot be obtained, and when it is thicker than 1.20 μm, an excitation efficiency is not good. On the other hand, it is described that when the adhesion coating is thinner than 1.80 μm, a sufficient adhesion ability cannot be obtained, and when it is thicker than 2.20 μm, an excitation efficiency is not good.

CITATION LIST

Patent Document

Patent Document 1

Japanese Unexamined Patent Application, First Publication No. 2015-12756

SUMMARY OF THE INVENTION

Problems to be Solved by the Invention

When an adhesive is applied thinly to make an adhesion part thinner, a proportion of electrical steel sheets in a laminated core increases. However, as described in Patent Document 1, when the adhesion part is too thin, the adhesion strength decreases. Therefore, it is conceivable to form a soft adhesion part using a soft adhesive while ensuring the adhesion strength. However, in this case, stress concentration occurs in the insulation coating due to a force applied when the adhesive cures and shrinks, and thus the electrical steel sheet easily peels off. The technique disclosed in Patent Document 1 does not recognize such a problem and, as a matter of course, cannot solve it.

The present invention has been made in view of the above circumstances, and an object thereof is to provide an adhesively-laminated core for a stator that can both prevent peeling of an insulation coating and inhibit deterioration of magnetic properties due to a stress applied to an electrical steel sheet by an adhesion part, and an electric motor including the adhesively-laminated core for a stator.

Means for Solving the Problem

In order to solve the above problem, the present invention employs the following means.

(1) One aspect of the present invention is an adhesively-laminated core for a stator including: a plurality of electrical steel sheets which have phosphate-based insulation coatings on surfaces thereof and are overlapped coaxially with each other; and adhesion parts provided between the respective electrical steel sheets, in which, an average thickness of the insulation coatings is 0.3 μm to 1.2 μm, an average thickness of the adhesion parts is 1.0 μm to 3.0 μm, and in a case where the average thickness of the insulation coating is defined as t1 in units of μm, and the average thickness of the adhesion parts is defined as t2 in a unit of μm, the following Equation 1 is satisfied.

$$-4.3 \times t1 + 3.6 \leq t2 \leq -4.3 \times t1 + 6.9 \quad \text{(Equation 1)}$$

(2) In the aspect according to the above (1), the following configuration may be adopted: the average thickness t1 is 0.7 μm to 0.9 μm; and the average thickness t2 is 1.2 μm to 2.6 μm.

(3) In the aspect according to the above (1) or the above (2), the following configuration may be adopted: an average tensile modulus of elasticity E of the adhesion parts is 1500 MPa to 4500 MPa; and the average tensile modulus of elasticity E (MPa) and the average thickness t1 (μm) of the insulation coating satisfy the following Equation 2.

$$-5000 \times t1 + 4500 \leq E \leq -5000 \times t1 + 9000 \quad \text{(Equation 2)}$$

(4) In the aspect according to the above (3), the following configuration may be adopted: the average tensile modulus of elasticity E is 1800 MPa to 3650 MPa; and the average thickness t1 is 0.7 μm to 0.9 μm.

(5) In the aspect according to any one of the above (1) to (4), the adhesion parts may be room temperature curing type acrylic-based adhesives each containing SGA made of an elastomer-containing acrylic-based adhesive.

(6) In the aspect according to any one of the above (1) to (5), an average sheet thickness of the electrical steel sheets may be 0.15 mm to 0.35 mm.

(7) An electric motor according to one aspect of the present invention includes the adhesively-laminated core for the stator according to any one of the above (1) to (6).

Effects of the Invention

According to each aspect of the present invention, an adhesively-laminated core for a stator that can both prevent peeling of an insulation coating and inhibit deterioration of magnetic properties due to a stress applied to an electrical steel sheet by an adhesion part, and an electric motor including the adhesively-laminated core for the stator can be provided.

EMBODIMENTS FOR IMPLEMENTING THE INVENTION

Hereinafter, with reference to the drawings, an adhesively-laminated core for a stator and an electric motor including the adhesively-laminated core for the stator according to one embodiment of the present invention will be described. Also, in the present embodiment, as the electric motor, a motor, specifically, an AC motor, more specifically, a synchronous motor, and more specifically, a permanent magnetic electric motor will be described as an example. This type of motor is suitably adopted for, for example, an electric vehicle.

Figure 1:
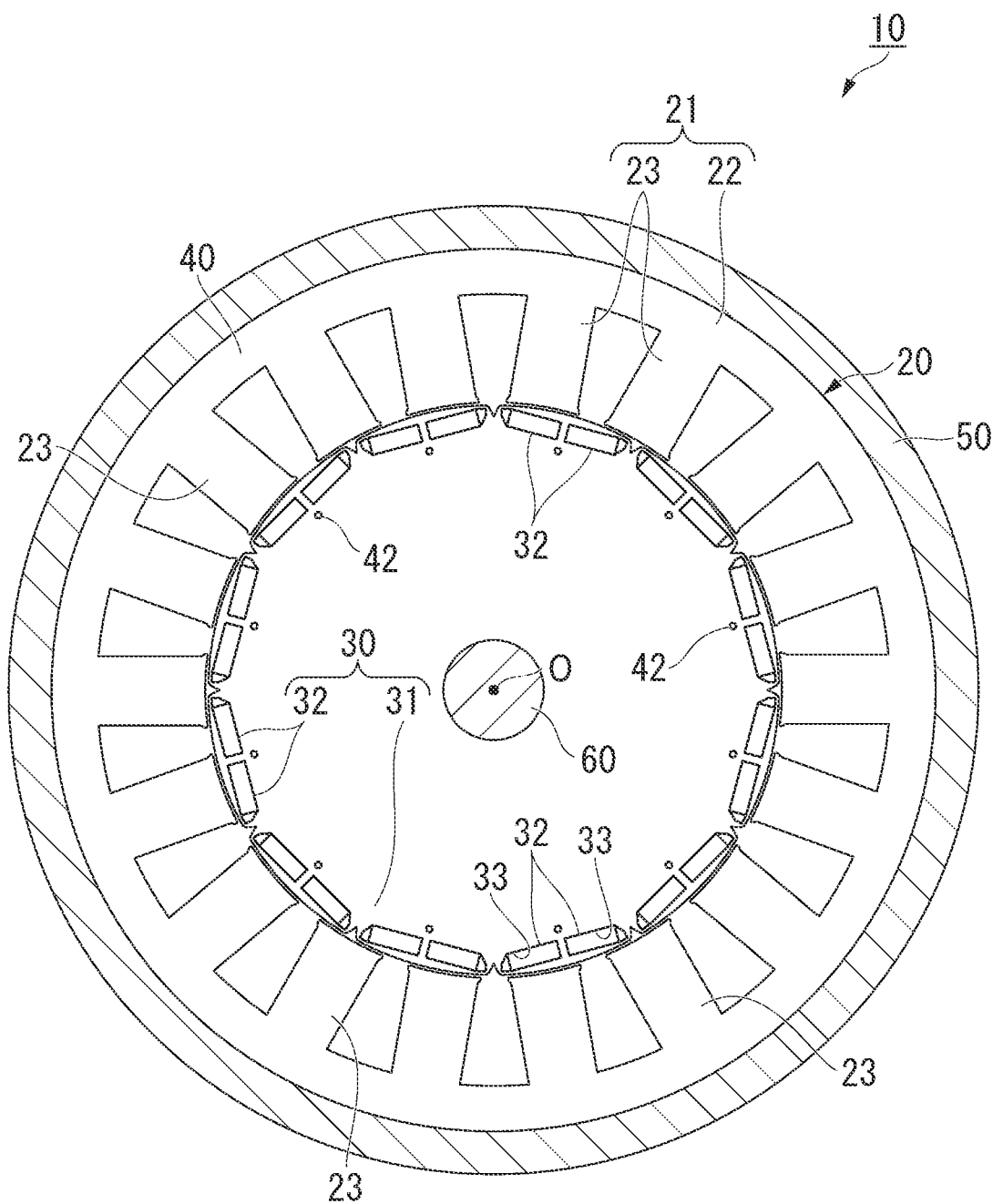
FIG. 1 is a cross-sectional view of an electric motor including an adhesively-laminated core for a stator according to one embodiment of the present invention.

As shown in FIG. 1, an electric motor 10 includes a stator 20, a rotor 30, a case 50, and a rotation shaft 60. The stator 20 and the rotor 30 are accommodated in the case 50. The stator 20 is fixed to the case 50.

In the present embodiment, as the electric motor 10, an inner rotor type electric motor in which the rotor 30 is located inside the stator 20 in a radial direction thereof is adopted. However, as the electric motor 10, an outer rotor type electric motor in which the rotor 30 is located outside the stator 20 may be adopted. Further, in the present embodiment, the electric motor 10 is a three-phase AC motor having 12 poles and 18 slots. However, the number of poles, the number of slots, the number of phases, and the like can be changed as appropriate.

The electric motor 10 can rotate at a rotation speed of 1000 rpm by applying, for example, an excitation current having an effective value of 10 A and a frequency of 100 Hz to each phase.

The stator 20 includes an adhesively-laminated core for a stator (hereinafter, a stator core) 21 and windings (not shown).

The stator core 21 includes an annular core back part 22 and a plurality of tooth parts 23. Below, a direction of a central axis O of the stator core 21 (or the core back part 22) is referred to as the axial direction, a radial direction (a direction orthogonal to the central axis O) of the stator core 21 (or the core back part 22) is referred to as the radial direction, and a circumferential direction (a direction revolving around the central axis O) of the stator core 21 (core back part 22) is referred to as the circumferential direction.

The core back part 22 is formed in an annular shape in a plan view of the stator 20 from the axial direction.

The plurality of tooth parts 23 extend inward in the radial direction (toward the central axis O of the core back part 22 in the radial direction) from an inner circumference of the core back part 22. The plurality of tooth parts 23 are disposed at equal angular intervals in the circumferential direction. In the present embodiment, 18 tooth parts 23 are provided at every 20 degrees with respect to a central angle centered on the central axis O. The plurality of tooth parts 23 are formed to have the same shape and the same size as each other. Therefore, the plurality of tooth parts 23 have the same thickness dimension as each other.

The windings are wound around the tooth parts 23. The windings may be concentrated windings or distributed windings.

The rotor 30 is disposed inside the stator 20 (stator core 21) in the radial direction. The rotor 30 includes a rotor core 31 and a plurality of permanent magnets 32.

The rotor core 31 is formed in an annular shape (an annular ring shape) disposed coaxially with the stator 20. The rotation shaft 60 is disposed inside the rotor core 31. The rotation shaft 60 is fixed to the rotor core 31.

The plurality of permanent magnets 32 are fixed to the rotor core 31. In the present embodiment, a set of two permanent magnets 32 form one magnetic pole. A plurality of sets of permanent magnets 32 are arranged at equal intervals in the circumferential direction. In the present embodiment, 12 sets (24 in total) of permanent magnets 32 are provided at every 30 degrees of the central angle centered on the central axis O.

In the present embodiment, an interior permanent magnet motor is adopted as a permanent magnetic electric motor. A plurality of through-holes 33 that penetrate the rotor core 31 in the axial direction are formed in the rotor core 31. The plurality of through-holes 33 are provided to correspond to the plurality of permanent magnets 32. Each permanent magnet 32 is fixed to the rotor core 31 in a state in which it is disposed in the corresponding through-hole 33. Fixing of each permanent magnet 32 to the rotor core 31 can be realized, for example, by providing adhesion between an outer surface of the permanent magnet 32 and an inner surface of the through-hole 33 with an adhesive or the like. Also, as the permanent magnet electric motor, a surface permanent magnet motor may be adopted instead of an interior permanent magnet type.

Figure 2:
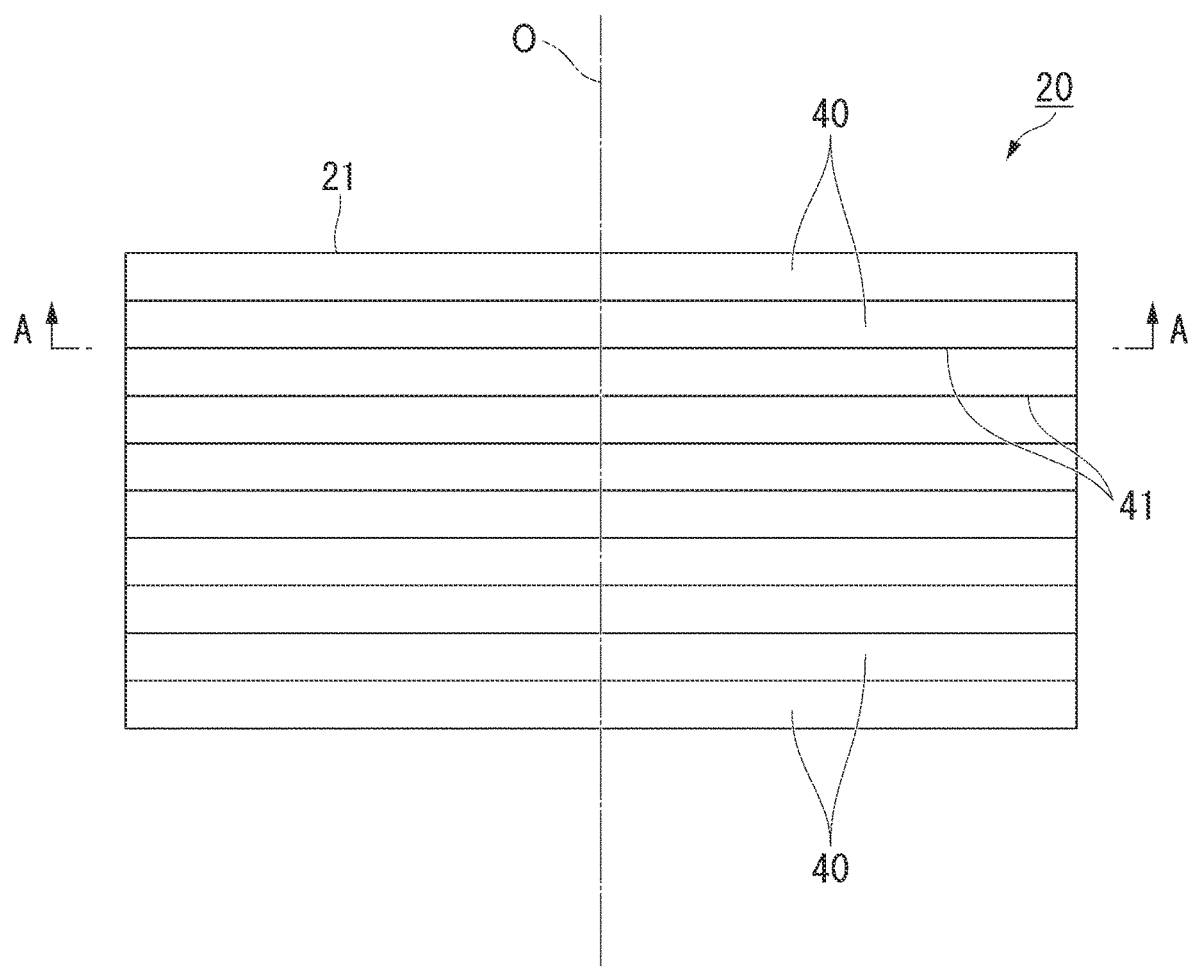
FIG. 2 is a side view of the laminated core for the stator.

The stator core 21 and the rotor core 31 are both laminated cores. For example, as shown in FIG. 2, the stator core 21 is formed by laminating a plurality of electrical steel sheets 40 in the axial direction.

Further, a laminated thickness (the entire length along the central axis O) of each of the stator core 21 and the rotor core 31 is, for example, 50.0 mm. An outer diameter of the stator core 21 is, for example, 250.0 mm. An inner diameter of the stator core 21 is, for example, 165.0 mm. An outer diameter of the rotor core 31 is, for example, 163.0 mm. An inner diameter of the rotor core 31 is, for example, 30.0 mm. However, these values are examples, and the laminated thickness, the outer diameter, and the inner diameter of the stator core 21 and the laminated thickness, the outer diameter, and the inner diameter of the rotor core 31 are not limited to only these values. Here, the inner diameter of the stator core 21 is measured with tips of the tooth parts 23 of the stator core 21 as a reference. That is, the inner diameter of the stator core 21 is a diameter of a virtual circle inscribed in the tips of all the tooth parts 23.

Each electrical steel sheet 40 forming the stator core 21 and the rotor core 31 is formed, for example, by punching an electrical steel sheet serving as a base material, etc. As the electrical steel sheet 40, a known electrical steel sheet can be used. A chemical composition of the electrical steel sheet 40 includes 2.5% to 3.9% Si, as shown below in units of mass %. By setting the chemical composition in these ranges, a yield strength YP of each electrical steel sheet 40 can be set to 380 MPa or more and 540 MPa or less.

Si: 2.5% to 3.9%
Al: 0.001% to 3.0%
Mn: 0.05% to 5.0%
Remainder: Fe and impurities In the present embodiment, a non-grain-oriented electrical steel sheet is used as the electrical steel sheet 40. As the non-grain-oriented electrical steel sheet, for example, a non-grain-oriented electrical steel strip of JIS C 2552:2014 can be adopted. However, as the electrical steel sheet 40, a grain-oriented electrical steel sheet may be used instead of a non-grain-oriented electrical steel sheet. As the grain-oriented electrical steel sheet in this case, a grain-oriented electrical steel strip of JIS C 2553:2012 can be adopted.

Phosphate-based insulation coating are provided on both surfaces of the electrical steel sheet 40 in order to improve workability of the stator core 21 (hereinafter, may be simply referred to as a "laminated core") and an iron loss of the laminated core. As a substance constituting the insulating coating, for example, (1) an inorganic compound, (2) an organic resin, (3) a mixture of an inorganic compound and an organic resin, and the like can be adopted. As the inorganic compound, for example, (1) a complex of dichromate and boric acid, (2) a complex of phosphate and silica, and the like can be exemplified. As the organic resin, an epoxy-based resin, an acrylic-based resin, an acrylic-styrene-based resin, a polyester-based resin, a silicone-based resin, a fluorine-based resin, and the like can be exemplified.

In order to ensure insulation performance between the electrical steel sheets 40 laminated with each other, a lower limit of an average thickness t1 of the insulation coating (an average thickness per one surface of the electrical steel sheet 40) is preferably 0.3 μm, more preferably to 0.7 μm.

On the other hand, the insulation effect becomes saturated when the insulation coating becomes thicker. Further, as the insulation coating becomes thicker, a space factor of the electrical steel sheet 40 in the laminated core decreases, and the performance of the laminated core deteriorates. Therefore, the insulation coating may be as thin as possible within a range in which the insulation performance can be ensured. An upper limit of the average thickness of the insulation coating (a thickness per one surface of the electrical steel sheet 40) is preferably 1.2 μm, more preferably 0.9 μm.

The average thickness t1 of the insulation coating is an average value of the entire laminated core. The thickness of the insulation coating is made to be almost the same over laminated positions thereof in the axial direction and a circumferential position around the central axis of the laminated core. For that reason, the average thickness t1 of the insulation coating can be set as a value measured at an upper end position of the laminated core.

As the thickness of the electrical steel sheet 40 becomes thinner, the proportion of the electrical steel sheet 40 in the laminated core decreases. Further, as the electrical steel sheet 40 becomes thinner, manufacturing costs of the electrical steel sheet 40 increase. For that reason, a lower limit of an average sheet thickness of the electrical steel sheet 40 is 0.15 mm, more preferably 0.18 mm in consideration of a decrease in the proportion of the electrical steel sheet 40 in the laminated core and the manufacturing costs.

On the other hand, if the electrical steel sheet 40 is too thick, the manufacturing costs become better, but an eddy current loss increases and a core loss deteriorates. For that reason, in consideration of the core loss and the manufacturing costs, an upper limit of the average sheet thickness of the electrical steel sheet 40 is 0.35 mm, more preferably 0.30 mm.

0.20 mm can be exemplified as one satisfying the above range of the average sheet thickness of the electrical steel sheet 40. Also, the average thickness of the electrical steel sheet 40 includes the thickness of the insulation coating.

Figure 3:
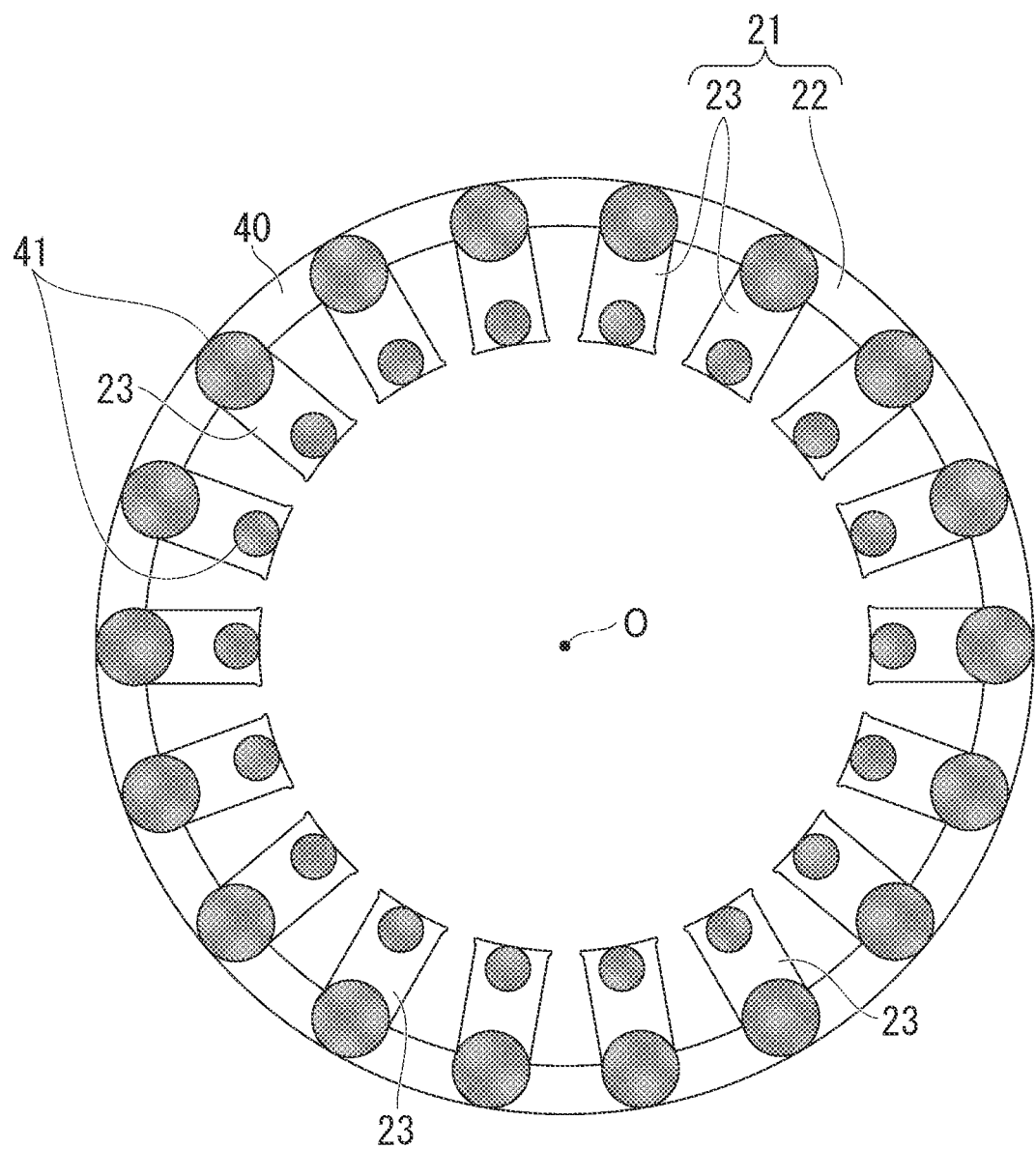
FIG. 3 is a cross-sectional view along line A-A in FIG. 2, showing an example of a formation pattern of adhesion parts in the adhesively-laminated core for the stator.

As shown in FIG. 3, the plurality of electrical steel sheets 40 forming the stator core 21 are laminated, for example, via the adhesion parts 41 disposed in a shape of a plurality of points. Each of the adhesion parts 41 is formed of an adhesive that has been cured without being divided. For forming the adhesion part 41, for example, a thermosetting type adhesive by polymer bonding or the like is used. As such an adhesive, a radical polymerization type adhesive or the like can also be used in addition to a thermosetting type adhesive, and from the viewpoint of productivity, a room temperature curing type adhesive is preferably used. The room temperature curing type adhesive cures at 20° C. to 30° C. As the room temperature curing type adhesive, an acrylic-based adhesive is preferable. A typical acrylic-based adhesive includes a second generation acrylic adhesive (SGA) and the like. Any of an anaerobic adhesive, an instant adhesive, and an elastomer-containing acrylic-based adhesive can be used within the range in which the effects of the present invention are not impaired. Also, the adhesive mentioned herein is an adhesive in a state before curing and becomes the adhesion part 41 after the adhesive is cured.

An average tensile modulus of elasticity E of the adhesion part 41 at room temperature (20° C. to 30° C.) is in the range of 1500 MPa to 4500 MPa. If the average tensile modulus of elasticity E of the adhesion part 41 is less than 1500 MPa, there will be a problem that rigidity of the laminated core is lowered. For that reason, a lower limit of the average tensile modulus of elasticity E of the adhesion part 41 is 1500 MPa, more preferably 1800 MPa. On the contrary, if the average tensile modulus of elasticity E of the adhesion part 41 exceeds 4500 MPa, there will be a problem that the insulation coating formed on the surface of the electrical steel sheet 40 is peeled off. For that reason, an upper limit of the average tensile modulus of elasticity E of the adhesion part 41 is 4500 MPa, more preferably 3650 MPa.

Also, the average tensile modulus of elasticity E is measured using a resonance method. Specifically, the tensile modulus of elasticity is measured in accordance with JIS R 1602:1995.

More specifically, first, a sample for measurement (not shown) is manufactured. This sample is obtained by providing adhesion between two electrical steel sheets 40 using an adhesive, which is a measurement target, and curing them to form the adhesion part 41. In a case in which the adhesive is a thermosetting type, the curing is performed by heating and pressurizing it under heating and pressurizing conditions in actual work. On the other hand, in a case in which the adhesive is a room temperature curing type, the curing is performed by pressurizing it at room temperature.

In addition, the tensile modulus of elasticity of this sample is measured using the resonance method. As described above, the method for measuring the tensile modulus of elasticity using the resonance method is performed in accordance with JIS R 1602:1995. Then, the tensile modulus of elasticity of the adhesion part 41 alone can be obtained by removing an amount of influence of the electrical steel sheet 40 itself from the tensile modulus of elasticity (measured value) of the sample by calculation.

Since the tensile modulus of elasticity obtained from the sample in this way is equal to an average value of the entire laminated core, this value is regarded as the average tensile modulus of elasticity E. The composition is set such that the average tensile modulus of elasticity E hardly changes at laminated positions in the axial direction or at circumferential positions around the central axis of the laminated core. For that reason, the average tensile modulus of elasticity E can be set to a value obtained by measuring the adhesion part 41 after curing at the upper end position of the laminated core.

As a method of providing adhesion between the plurality of electrical steel sheets 40, a method of adhering with which an adhesive is applied in a point shape to lower surfaces (surfaces on one side) of the electrical steel sheets 40, then they are overlapped, and then one or both of heating and press-stacking are performed can be adopted. Also, a means in the case of heating may be any means such as a means for heating the stator core 21 in a high temperature bath or an electric furnace, or a method of directly energizing and heating the stator core 21. On the other hand, in a case in which a room temperature curing type adhesive is used, they are adhered only by press-stacking without heating.

FIG. 3 shows an example of a formation pattern of the adhesion parts 41. Each adhesion part 41 is formed in a shape having a plurality of points forming a circular shape. More specifically, in the core back part 22, they are formed in point shapes having an average diameter of 12 mm at equal angular intervals in the circumferential direction thereof. Further, at a tip position of each tooth part 23, the adhesion part 41 is formed in a point shape having an average diameter of 8 mm. The average diameters shown here are examples and can be appropriately selected from the range of 2 mm to 20 mm. In addition, the formation pattern of FIG. 3 is an example, and the number and arrangements of the adhesion parts 41 can be appropriately changed as needed. Also, the shape of each adhesion part 41 is not limited to a circular shape and may be a rectangular shape or another polygonal shape if necessary.

The average thickness t2 of the adhesion part 41 is 1.0 μm or more and 3.0 μm or less. When the average thickness t2 of the adhesion part 41 is less than 1.0 μm, a sufficient adhesion force cannot be secured. For that reason, a lower limit of the average thickness t2 of the adhesion part 41 is 1.0 μm, more preferably 1.2 μm. On the contrary, when the average thickness t2 of the adhesion part 41 becomes thicker than 3.0 μm, there will be problems such as a great increase in a strain amount of the electrical steel sheet 40 due to shrinkage during thermosetting. For that reason, an upper limit of the average thickness t2 of the adhesion part 41 is 3.0 μm, more preferably 2.6 μm, and most preferably 1.8 μm.

The average thickness t2 of the adhesion part 41 is an average value of the entire laminated core. The average thickness t2 of the adhesion parts 41 hardly changes at laminated positions in the axial direction and the circumferential position around the central axis of the laminated core. For that reason, the average thickness t2 of the adhesion parts 41 can be set as an average value of the numerical values measured at 10 or more points in the circumferential direction at the upper end position of the laminated core.

In addition, the average thickness t2 (μm) of the adhesion part 41 and the average thickness t1 (μm) of the insulation coating satisfy the following Equation 1.

$$-4.3 \times t1 + 3.6 \leq t2 \leq -4.3 \times t1 + 6.9 \quad \text{(Equation 1)}$$

Further, the average tensile modulus of elasticity F. of the adhesion parts 41 is 1500 MPa to 4500 MPa, and the average tensile modulus of elasticity E (MPa) and the average thickness t1 (μm) of the insulation coating satisfy the following Equation 2.

$$-5000 \times t1 + 4500 \leq E \leq -5000 \times t1 + 9000 \quad \text{(Equation 2)}$$

First of all, regarding the above Equation 1, when the average thickness t2 of the adhesion parts 41 is thinner than $-4.3 \times t1 + 3.6$, the bond with the insulation coating is poor and the adhesion strength cannot be secured, and the mechanical strength of the stator core 21 cannot be maintained. On the other hand, when the average thickness t2 of the adhesion parts 41 becomes thicker than $-4.3 \times t1 + 6.9$, close adhesion between the insulation coating and the electrical steel sheet 40 tends to decrease due to the stress exerted by the adhesion parts 41 on the insulation coating. From the above, the average thickness t2 of the adhesion parts 41 is within the range of Equation 1.

Next, regarding the above Equation 2, when the average tensile modulus of elasticity E of the adhesion parts 41 is lower than $-5000 \times t1 + 4500$, the bond between the adhesion parts 41 and the insulation coating becomes poor and the adhesion strength cannot be maintained, and the mechanical strength of the stator core 21 may not be maintained. On the other hand, when the average tensile modulus of elasticity E of the adhesion parts 41 is higher than $-5000 \times t1 + 9000$, the stress exerted by the adhesion parts 41 on the insulation coating may reduce the adhesion between the insulation coating and the electrical steel sheet 40. From the above, the average tensile modulus of elasticity E of the adhesion parts 41 is preferably within the range of Equation 2.

In addition, the average thickness of the adhesion parts 41 can be adjusted by changing, for example, an amount of an adhesive applied. Also, for example, in the case of a thermosetting type adhesive, the average tensile modulus of elasticity E of the adhesion parts 41 can be adjusted by changing one or both of the heating and pressurizing conditions and a type of a curing agent applied at the time of adhesion.

Further, for the above-mentioned reason, it is more preferable that the average thickness t1 (μm) and the average thickness t2 (μm) further satisfy the following Equations 3 and 4.

$$0.7 \leq t1 \leq 0.9 \quad \text{(Equation 3)}$$

$$1.2 \leq t2 \leq 2.6 \quad \text{(Equation 4)}$$

Also, in the present embodiment, the plurality of electrical steel sheets forming the rotor core 31 are fixed to each other by fastening 42 (dowels) shown in FIG. 1. However, the plurality of electrical steel sheets forming the rotor core 31 may also have a laminated structure fixed by adhesion parts similarly to the stator core 21. Further, the laminated cores such as the stator core 21 and the rotor core 31 may be formed by so-called turn-stacking.

Examples

Figure 4:
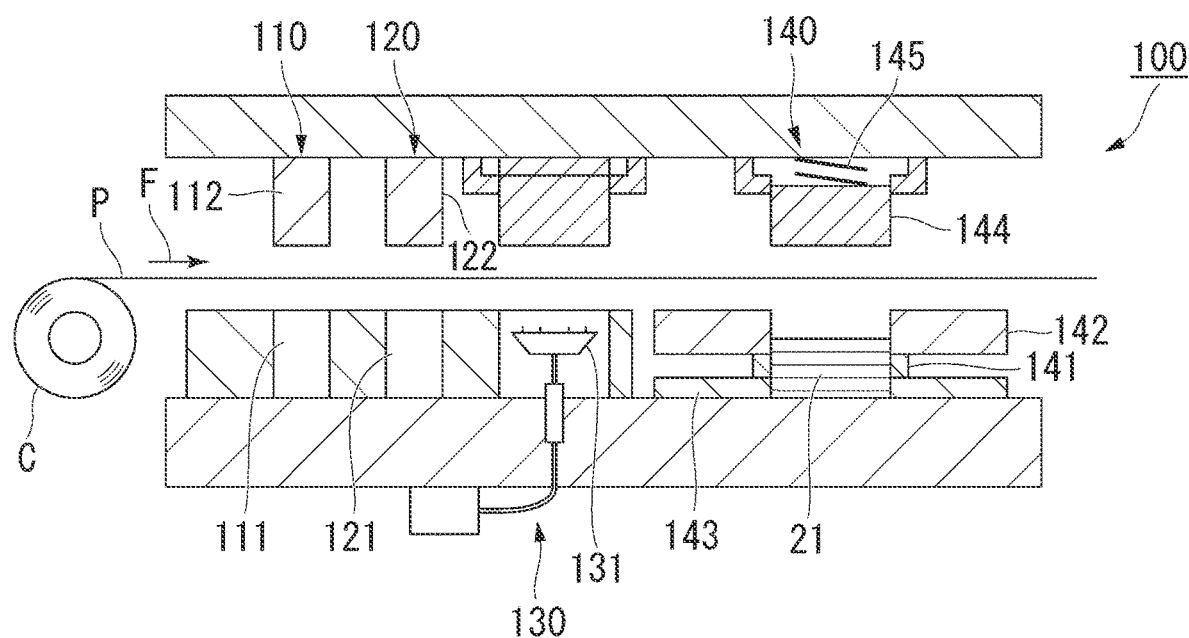
FIG. 4 is a side view of a manufacturing device used for manufacturing an example of the adhesively-laminated core for the stator.

Using a manufacturing device 100 shown in FIG. 4, the stator core 21 was manufactured while changing various manufacturing conditions.

First, the manufacturing device 100 will be described. In the manufacturing device 100, while feeding electrical steel sheets P from a coil C (a hoop) in a direction of arrow F, punching is performed a plurality of times by molds disposed on each stage to gradually form shapes of the electrical steel sheets 40. Then, an adhesive is applied to lower surfaces of the electrical steel sheets 40, and the punched electrical steel sheets 40 are laminated and pressed while raising a temperature. As a result, the adhesive is cured to form the adhesion parts 41, and thus the adhesion is completed.

As shown in FIG. 4, the manufacturing device 100 includes a first-stage punching station 110 at a position closest to the coil C, a second-stage punching station 120 adjacently disposed on a downstream side in a conveyance direction of the electrical steel sheet P from the punching station 110, and an adhesive-coating station 130 adjacently disposed on a further downstream side thereof from the punching station 120.

The punching station 110 includes a fixed mold 111 disposed below the electrical steel sheet P and a movable mold 112 disposed above the electrical steel sheet P.

The punching station 120 includes a fixed mold 121 disposed below the electrical steel sheet P and a movable mold 122 disposed above the electrical steel sheet P.

The adhesive-coating station 130 includes an applicator 131 including a plurality of injectors disposed in accordance with an adhesive coating pattern.

The manufacturing device 100 further includes a stacking station 140 at a downstream position from the adhesive-coating station 130. The stacking station 140 includes a heating device 141, a fixed mold for outer shape 142, a heat insulation member 143, a movable mold for outer shape 144, and a spring 145.

The heating device 141, the fixed mold for outer shape 142, and the heat insulation member 143 are disposed below the electrical steel sheet P. On the other hand, the movable mold for outer shape 144 and the spring 145 are disposed above the electrical steel sheet P. Also, reference numeral 21 indicates the stator core.

In the manufacturing device 100 having the configuration described above, first, the electrical steel sheet P is sequentially sent out from the coil C in the direction of arrow F of FIG. 4. Then, the electrical steel sheet P is, first, punched by the punching station 110. Subsequently, the electrical steel sheet P is punched by the punching station 120. By these punching processes, the shape of the electrical steel sheet 40 having the core back part 22 and the plurality of tooth parts 23 shown in FIG. 3 is obtained on the electrical steel sheet P. However, since it is not completely punched at this point, the process proceeds to the next step in the direction of arrow F. In the adhesive-coating station 130 in the next step, the adhesive supplied from each of the injectors of the applicator 131 is applied in a point shape.

Then, finally, the electrical steel sheet P is sent out to the stacking station 140, punched out by the movable mold for outer shape 144, and laminated with high accuracy. At the time of this stacking, the electrical steel sheet 40 receives a constant pressing force by the spring 145.

By sequentially repeating the punching process, the adhesive-coating process, and the stacking process as described above, a predetermined number of electrical steel sheets 40 can be laminated. Further, the laminated core formed by stacking the electrical steel sheets 40 in this way is heated to, for example, a temperature of 200° C. by the heating device 141. This heating cures the adhesives to form the adhesion parts 41.

The stator core 21 is completed through each of the above steps.

Using the manufacturing device 100 described above, the stator cores 21 shown in No. 1 to No. 29 in Tables 1A and 1B were manufactured. The chemical components of the electrical steel sheet 40 used in manufacturing each stator core 21 were unified as follows. In addition, each component value indicates mass %.

Si: 3.1%
Al: 0.7%
Mn: 0.3%
Remainder: Fe and impurities

TABLE 1A

| No. | Electrical steel sheet Average sheet thickness (mm) | Insulation coating Average thickness t1 (μm) | Adhesion part Adhesive used | Average thickness t2 (μm) | Average tensile modulus of elasticity (MPa) | Whether or not to satisfy Equation 1(*a) | Whether or not to satisfy Equation 2(*b) |
|---|---|---|---|---|---|---|---|
| 1 | 0.20 | 0.3 | Elastomer-based | 2.4 | 3600 | Satisfied | Satisfied |
| 2 | 0.20 | 0.3 | Elastomer-based | 2.8 | 4200 | Satisfied | Satisfied |
| 3 | 0.20 | 0.5 | Elastomer-based | 1.5 | 2300 | Satisfied | Satisfied |
| 4 | 0.20 | 0.5 | Elastomer-based | 2.1 | 3200 | Satisfied | Satisfied |
| 5 | 0.20 | 0.5 | Elastomer-based | 2.7 | 4100 | Satisfied | Satisfied |
| 6 | 0.20 | 0.7 | Elastomer-based | 1.6 | 2400 | Satisfied | Satisfied |
| 7 | 0.20 | 0.7 | Elastomer-based | 2.3 | 3500 | Satisfied | Satisfied |
| 8 | 0.20 | 0.8 | Elastomer-based | 1.4 | 2100 | Satisfied | Satisfied |
| 9 | 0.20 | 0.8 | Elastomer-based | 2.7 | 4100 | Satisfied | Satisfied |
| 10 | 0.20 | 0.9 | Elastomer-based | 1.8 | 2700 | Satisfied | Satisfied |
| 11 | 0.20 | 0.9 | Elastomer-based | 2.3 | 3500 | Satisfied | Satisfied |
| 12 | 0.20 | 1.0 | Elastomer-based | 1.6 | 2400 | Satisfied | Satisfied |
| 13 | 0.20 | 1.0 | Elastomer-based | 2.2 | 3300 | Satisfied | Satisfied |
| 14 | 0.20 | 1.2 | Elastomer-based | 1.1 | 2000 | Satisfied | Satisfied |
| 15 | 0.20 | 1.2 | Elastomer-based | 1.3 | 2000 | Satisfied | Satisfied |
| 16 | 0.20 | 0.1 | Elastomer-based | 1.2 | 1800 | Unsatisfied | Unsatisfied |
| 17 | 0.20 | 0.1 | Elastomer-based | 2.1 | 3200 | Unsatisfied | Unsatisfied |
| 18 | 0.20 | 0.3 | Elastomer-based | 1.3 | 2000 | Unsatisfied | Unsatisfied |
| 19 | 0.20 | 0.3 | Elastomer-based | 3.4 | 5100 | Satisfied | Satisfied |
| 20 | 0.20 | 0.4 | Elastomer-based | 1.2 | 1800 | Unsatisfied | Unsatisfied |
| 21 | 0.20 | 0.6 | Elastomer-based | 3.6 | 5400 | Satisfied | Satisfied |
| 22 | 0.20 | 0.8 | Elastomer-based | 0.5 | 800 | Satisfied | Satisfied |
| 23 | 0.20 | 0.8 | Elastomer-based | 3.2 | 4800 | Satisfied | Satisfied |
| 24 | 0.20 | 1.1 | Elastomer-based | 0.7 | 1100 | Satisfied | Satisfied |
| 25 | 0.20 | 1.1 | Elastomer-based | 2.6 | 3900 | Unsatisfied | Unsatisfied |
| 26 | 0.20 | 1.5 | Elastomer-based | 0.8 | 1200 | Unsatisfied | Satisfied |
| 27 | 0.20 | 1.4 | Elastomer-based | 2.8 | 4200 | Unsatisfied | Unsatisfied |
| 28 | 0.20 | 0.8 | Anaerobic adhesive | 2.8 | 4200 | Satisfied | Satisfied |
| 29 | 0.20 | 1.1 | Elastomer-based | 2.0 | 4200 | Satisfied | Unsatisfied |

(*a) $-4.3 \times t1 + 3.6 \leq t2 \leq -4.3 \times t1 + 6.9$ ... (Equation 1)
(*b) $-5000 \times t1 + 4500 \leq E \leq -5000 \times t1 + 9000$ ... (Equation 2)

TABLE 1B

| No. | Mechanical strength (MPa) | Decision | Presence or absence of peeling of insulation coating | Magnetic properties W 15/50 | Decision | Example/ Comparative example |
|---|---|---|---|---|---|---|
| 1 | 6 | Good | Absence | 2.53 | Good | Example |
| 2 | 8 | Good | Absence | 2.56 | Good | Example |
| 3 | 7 | Good | Absence | 2.50 | Excellent | Example |
| 4 | 6 | Good | Absence | 2.56 | Good | Example |
| 5 | 10 | Excellent | Absence | 2.58 | Good | Example |
| 6 | 10 | Excellent | Absence | 2.49 | Excellent | Example |
| 7 | 5 | Good | Absence | 2.59 | Good | Example |
| 8 | 9 | Excellent | Absence | 2.50 | Excellent | Example |
| 9 | 5 | Good | Absence | 2.53 | Good | Example |
| 10 | 9 | Excellent | Absence | 2.51 | Excellent | Example |
| 11 | 7 | Good | Absence | 2.57 | Good | Example |
| 12 | 6 | Good | Absence | 2.50 | Excellent | Example |
| 13 | 6 | Good | Absence | 2.58 | Good | Example |
| 14 | 7 | Good | Absence | 2.59 | Excellent | Example |
| 15 | 5 | Good | Absence | 2.51 | Excellent | Example |
| 16 | 6 | Good | Absence | 2.74 | Poor | Comparative example |
| 17 | 9 | Excellent | Absence | 2.79 | Poor | Comparative example |
| 18 | 1 | Poor | Absence | 2.63 | Good | Comparative example |
| 19 | 10 | Excellent | Presence | 2.87 | Poor | Comparative example |
| 20 | 2 | Poor | Absence | 2.58 | Good | Comparative example |
| 21 | 10 | Excellent | Presence | 2.74 | Poor | Comparative example |
| 22 | 1 | Poor | Absence | 2.58 | Good | Comparative example |
| 23 | 9 | Excellent | Presence | 2.81 | Poor | Comparative example |
| 24 | 1 | Poor | Absence | 2.57 | Good | Comparative example |
| 25 | 2 | Poor | Absence | 2.56 | Good | Comparative example |
| 26 | 7 | Good | Presence | 2.57 | Good | Comparative example |
| 27 | 8 | Good | Presence | 2.53 | Good | Comparative example |
| 28 | 6 | Good | Presence | 2.83 | Poor | Comparative example |
| 29 | 5 | Good | Absence | 2.54 | Good | Example |

Specifically, a plurality of hoops (coils C) having the above chemical components were manufactured. A sheet thickness of a base steel of each hoop was unified to 0.20 mm. Then, an insulation coating treatment agent containing a metal phosphate and an acrylic resin emulsion was applied to each of these hoops and baked at 300° C. to form insulation coatings on both front and back surfaces thereof. At that time, thicknesses of the insulation coatings were changed for each hoop. Specifically, as shown in Table 1A, each insulation coating was formed such that the average thickness t1 (μm) on one surface becomes 0.1 μm, 0.3 μm, 0.4 μm, 0.5 μm, 0.6 μm, 0.7 μm, 0.8 μm, 0.9 μm, 1.0 μm, 1.1 μm, 1.2 μm, 1.4 μm, and 1.5 μm.

Then, the hoop set in the manufacturing device 100 was changed, or the type of adhesive applied to the electrical steel sheet 40, the type of curing agent added to the adhesive, the type of curing accelerator, and a coating film thickness were changed, whereby as shown in Table 1 A, a plurality of laminated cores (stator cores 21) having different combinations of the average thickness t1 of the insulation coating, the type of adhesive, the average thickness t2 of the adhesion part 41, and the average tensile modulus of elasticity E were manufactured.

Specifically, first, one of the hoops was set in the manufacturing device 100. Then, while feeding out the electrical steel sheet P from this hoop in the direction of arrow F in FIG. 4, a single-plate core (the electrical steel sheet 40), which has a ring shape with an outer diameter of 300 mm and an inner diameter of 240 mm and is provided with 18 rectangular tooth parts 23 having a length of 30 mm and a width of 15 mm on an inner diameter side thereof was punched out.

Subsequently, while the punched single-plate core was sequentially fed, it was applied with the adhesive in a point shape at each position shown in FIG. 3, then laminated, heated while pressed at a predetermined pressure, and cured. The same work was repeated for 130 single-plate cores and one laminated core (the stator core 21) was manufactured.

By performing the same process for each hoop while changing each combination condition, 29 types of laminated cores shown in No. 1 to No. 29 in Tables 1A and 1B were manufactured.

In addition, as the adhesive, a second generation acrylic-based adhesive was used as an elastomer-based adhesive in No. 1 to No. 27 and No. 29. On the other hand, in No. 28, a general-purpose anaerobic adhesive was used as an anaerobic adhesive.

Further, the average thickness t2 of the adhesion parts 41 was adjusted by changing the coating amount for each laminated core. Also, the average tensile modulus of elasticity E of the adhesion parts 41 was adjusted for each laminated core by changing one or both of the heating and pressurizing conditions and the type of curing agent applied at the time of adhesion at the stacking station 140.

Each laminated core manufactured using the method described above was cut in a cross-section including their axes. Then, the average thickness t1 (μm) of the insulation coatings was determined. Further, in the adhesion parts 41, the average thickness t2 (μm) and the average tensile modulus of elasticity E after curing were determined. The average tensile modulus of elasticity E was determined using the method described above. An outer diameter of each point-shaped adhesive after curing was 5 mm on average.

Then, the average thickness t1 (μm), the average thickness t2 (μm), and the average tensile modulus of elasticity E (MPa) were substituted into the above-mentioned Equations 1 and 2 and were determined whether or not Equations 1 and 2 were satisfied. The results are shown in Table 1A.

Further, rigidity (mechanical strength) of the laminated core was also evaluated. The mechanical strength was evaluated with a magnitude of a load when a cutting edge with a width of 20 mm, a tip angle of 10°, and 0.15 mm R was gradually pressed against a laminated part (between a pair of electrical steel sheets 40 adjacent to each other) of the laminated core while increasing the load to generate cracks. A higher load is more preferable, and the one having 4 MPa or more was judged to be good or excellent. In the mechanical strength of the laminated core in Table 1B, "excellent" indicates that high mechanical strength is secured, "good" indicates that necessary and sufficient mechanical strength is secured, and "poor" indicates that the minimum required mechanical strength is not secured.

Further, presence or absence of peeling of the insulation coating was also evaluated. Regarding the presence or absence of peeling of the insulation coating in Table 1B, "absence" indicates a state in which there is no peeling, and "presence" indicates a state in which peeling occurs in places.

Furthermore, the magnetic properties of the laminated core were also evaluated. When the magnetic properties were evaluated, the number of laminated sheets was set to 20, winding was performed after covering the laminated core with insulating paper, and the core loss (W15/50 in Table 1B) was measured at a frequency of 50 Hz and a magnetic flux density of 1.5 Tesla. Here, the number of lamination of the electrical steel sheets 40 when the evaluation of the magnetic properties was performed was set to 20 because almost the same results as in the case of 130 can be obtained.

A lower core loss (W15/50 in Table 1B) is more preferable, and the one having 2.70 or less was decided to be good or excellent. In the magnetic properties of the laminated cores in Table 1B, "excellent" indicates that high magnetic properties can be secured, "good" indicates that necessary and sufficient magnetic properties are secured, and "poor" indicates that the minimum required magnetic properties are not secured.

Figure 5:
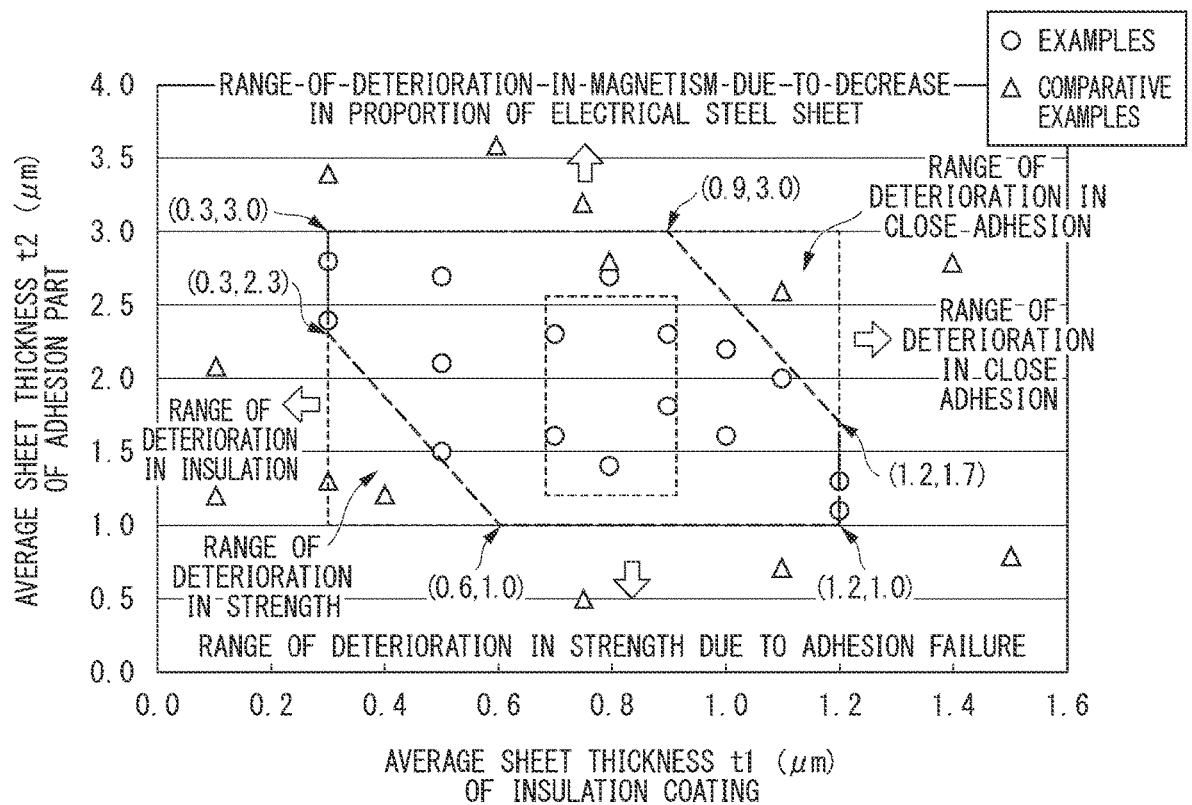
FIG. 5 is a graph showing a relationship between an average thickness t1 of an insulation coating and an average thickness t2 of the adhesion parts in the same example.
Figure 6:
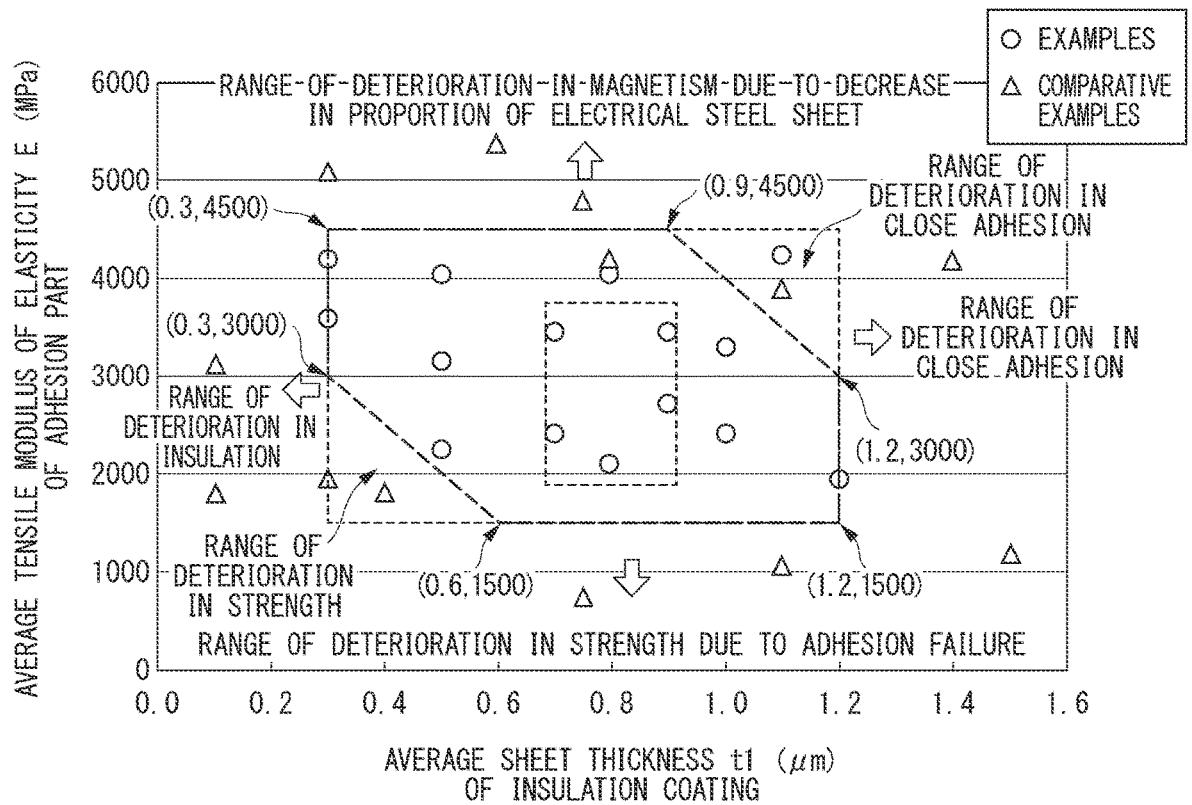
FIG. 6 is a graph showing a relationship between the average thickness t1 of the insulation coating and an average tensile modulus of elasticity E of the adhesion parts in the same example.

Further, FIG. 5 shows a relationship between the average thickness t1 of the insulation coatings and the average thickness t2 of the adhesion parts 41 shown in Table 1A. Similarly, FIG. 6 shows a relationship between the average thickness t1 of the insulation coatings and the average tensile modulus of elasticity E of the adhesion parts 41 shown in Table 1A.

As shown in Tables 1A and 1B, in the comparative examples shown in Nos. 16 and 17, the average thickness t1 of the insulation coatings was thin and the magnetic properties deteriorated.

Also, in the comparative example shown in No. 18, unevenness of the insulation coatings could not be filled, and the mechanical strength decreased.

Also, in the comparative example shown in No. 19, the average thickness t2 of the adhesion parts 41 was thick, the proportion of the electrical steel sheets 40 in the laminated core decreased, and the magnetic properties deteriorated.

Also, in the comparative example shown in No. 20, the unevenness of the insulation coatings could not be filled, and the mechanical strength decreased.

Also, in the comparative example shown in No. 21, the average thickness t2 of the adhesion parts 41 was thick, the proportion of the electrical steel sheets 40 in the laminated core decreased, and the magnetic properties deteriorated.

Also, in the comparative example shown in No. 22, the average thickness t2 of the adhesion parts 41 was thin, the adhesion strength was lowered, and the mechanical strength was lowered.

Also, in the comparative example shown in No. 23, the average thickness t2 of the adhesion parts 41 was thick, the proportion of the electrical steel sheets 40 in the laminated core decreased, and the magnetic properties deteriorated.

Also, in the comparative example shown in No. 24, the average thickness t2 of the adhesion part 41 was thin, the adhesion strength was lowered, and the mechanical strength was lowered.

Also, in the comparative example shown in No. 25, since the average thickness t1 of the insulation coatings was relatively thick and the adhesion tended to decrease, the upper limit of the average thickness t2 of the adhesion parts 41 (the upper limit of the average tensile modulus of elasticity E) substantially decreased, and the mechanical strength decreased.

Also, in the comparative example shown in No. 26, the average thickness t1 of the insulation coatings was thick, the adhesion was lowered, and the coatings were peeled off.

Also, in the comparative example shown in No. 27, the average thickness t1 of the insulation coatings was thick, the adhesion was lowered, and the coatings were peeled off.

Further, although the comparative example shown in No. 28 was in the region shown in each of FIGS. 5 and 6, the adhesive used for adhesion was an anaerobic adhesive and did not have a sea-island structure, and thus the cured adhesion parts 41 generated strain in the electrical steel sheets 40, and due to the strain of the electrical steel sheets 40, the magnetic properties deteriorated.

On the other hand, in Nos. 1 to 15 and 29, which are the examples, it was confirmed that the rigidity (mechanical strength) of the laminated core was high, the insulation coatings were not peeled off, and the magnetic properties (W15/50) had desired performance.

Among these examples, in particular, in Nos. 3, 6, 8, 10, 12, 14, and 15, since the average thickness t2 of the adhesion parts 41 was 1.8 μm or less, even higher magnetic properties were be obtained than in other examples.

Further, among these, in Nos. 6, 8 and 10, the average thickness t1 of the insulation coatings also satisfies the range of 0.7 μm to 0.9 μm. For that reason, optimization has been performed with respect to securing of insulation performance is deterioration of performance as a laminated core, which is the most preferable among all the examples.

Also, in the present examples, a thermosetting type adhesive was applied, but there is no difference in the basic tendency even with a room temperature curing type adhesive.

The embodiment and the examples of the present invention have been described above. However, the technical scope of the present invention is not limited to the above-described embodiment and the examples, and various changes can be added thereto without departing from the spirit of the present invention.

For example, the shape of the stator core 21 is not limited to the form shown in the above embodiment. Specifically, dimensions of the outer diameter and the inner diameter of the stator core 21, the laminated thickness, the number of slots, a dimensional ratio of the tooth part 23 between in the circumferential direction and in the radial direction, a dimensional ratio in the radial direction between the tooth part 23 and the core back part 22, and the like can be arbitrarily designed in accordance with desired properties of the electric motor.

In the rotor 30 of the above embodiment, the set of two permanent magnets 32 form one magnetic pole, but the present invention is not limited thereto. For example, one permanent magnet 32 may form one magnetic pole, or three or more permanent magnets 32 may form one magnetic pole.

In the above-described embodiment, the permanent magnetic electric motor has been described as an example of the electric motor 10, but as illustrated below, the structure of the electric motor 10 is not limited thereto, and various known structures not illustrated below can also be adopted.

In the above-described embodiment, the permanent magnetic electric motor has been described as an example of the electric motor 10, but the present invention is not limited thereto. For example, the electric motor 10 may be a reluctance motor or an electromagnet field motor (a wound-field motor).

In the above-described embodiment, the synchronous motor has been described as an example of the AC motor, but the present invention is not limited thereto. For example, the electric motor 10 may be an induction motor.

In the above-described embodiment, the AC motor has been described as an example of the electric motor 10, but the present invention is not limited thereto. For example, the electric motor 10 may be a DC motor.

In the above-described embodiment, the motor has been described as an example of the electric motor 10, but the present invention is not limited thereto. For example, the electric motor 10 may be a generator.

In addition, within the range not departing from the spirit of the present invention, it is possible to replace the components in the embodiment with well-known components as appropriate, and the above-mentioned modified examples may be combined with each other as appropriate.

INDUSTRIAL APPLICABILITY

According to the present invention, an adhesively-laminated core for a stator that can both prevent peeling of an insulation coating and inhibit deterioration of magnetic properties due to a stress applied to an electrical steel sheet by an adhesion part, and an electric motor including the adhesively-laminated core for the stator can be provided. Therefore, it provides great industrial applicability.

BRIEF DESCRIPTION OF THE REFERENCE SYMBOLS

10 Electric motor
21 Laminated core (adhesively-laminated core for stator)
40 Electrical steel sheet
41 Adhesion part

What is claimed is:

1. An adhesively-laminated core for a stator comprising:
   a plurality of electrical steel sheets which have phosphate-based insulation coatings on surfaces thereof and are overlapped coaxially with each other; and
   adhesion parts provided between the respective electrical steel sheets,
   wherein an average thickness of the insulation coatings is 0.3 μm to 1.2 μm,
   an average thickness of the adhesion parts is 1.0 μm to 3.0 μm, and
   in a case where the average thickness of the insulation coating is defined as t1 in a unit of μm, and the average thickness of the adhesion parts is defined as t2 in a unit of μm, the following Equation 1 is satisfied, $$-4.3 \times t1 + 3.6 \leq t2 \leq -4.3 \times t1 + 6.9 \quad \text{(Equation 1)}$$

wherein an average tensile modulus of elasticity E of the adhesion parts is 1500 MPa to 4500 MPa, and
   the average tensile modulus of elasticity E (MPa) and the average thickness t1 (μm) of the insulation coating satisfy the following Equation 2, $$-5000 \times t1 + 4500 \leq E \leq -5000 \times t1 + 9000 \quad \text{(Equation 2)}.$$

2. The adhesively-laminated core for the stator according to claim 1,
   wherein the average thickness t1 is 0.7 μm to 0.9 μm, and the average thickness t2 is 1.2 μm to 2.6 μm.

3. The adhesively-laminated core for the stator according to claim 1,
   wherein the average tensile modulus of elasticity E is 1800 MPa to 3650 MPa, and
   the average thickness t1 is 0.7 μm to 0.9 μm.

4. The adhesively-laminated core for the stator according to claim 1, wherein the adhesion parts are room temperature curing type acrylic-based adhesives each containing SGA made of an elastomer-containing acrylic-based adhesive.

5. The adhesively-laminated core for the stator according to claim 1, wherein an average sheet thickness of the electrical steel sheets is 0.15 mm to 0.35 mm.

6. An electric motor comprising the adhesively-laminated core for the stator according to-claim 1.

* * * * *